United States Patent [19]

Beaulieu

[11] Patent Number: 4,773,806
[45] Date of Patent: Sep. 27, 1988

[54] AGRICULTURAL VEHICLE FOR TRANSPORTING AND FEEDING HAY

[76] Inventor: Burl R. Beaulieu, Rte. 1, Hager City, Wis. 54014

[21] Appl. No.: 33,757

[22] Filed: Apr. 3, 1987

[51] Int. Cl.$^4$ ............................................. A01D 87/12
[52] U.S. Cl. .................................... 414/24.5; 414/459
[58] Field of Search ...................... 414/24.5, 24.6, 459, 414/460

[56] References Cited

U.S. PATENT DOCUMENTS

| | | | |
|---|---|---|---|
| 2,959,310 | 11/1960 | Meister | 414/459 |
| 4,067,298 | 1/1978 | Jones et al. | 414/24.5 X |
| 4,072,241 | 2/1978 | Parker et al. | 414/24.5 |
| 4,204,790 | 5/1980 | Baxter | 414/24.5 |
| 4,227,844 | 10/1980 | Love | 414/24.5 |
| 4,537,548 | 8/1985 | Lockhart | 414/24.5 |

FOREIGN PATENT DOCUMENTS

| | | | |
|---|---|---|---|
| 1100914 | 5/1981 | Canada | 414/24.5 |
| 2307332 | 8/1973 | Fed. Rep. of Germany | 414/459 |
| 2026429 | 2/1980 | United Kingdom | 414/24.5 |
| 390790 | 12/1973 | U.S.S.R. | 414/459 |

Primary Examiner—Leslie J. Paperner
Attorney, Agent, or Firm—Steven E. Kahm

[57] ABSTRACT

An agricultural vehicle for transporting and feeding round bales of hay consisting of a vehicle frame having wheels, which are retractable for setting the vehicle on the ground, a trailer hitch for towing the vehicle, a plurality of inverted U shaped frame members for supporting opposing jaws which are attached at the top of the inverted U shaped frame member. The opposing jaws engage bales of hay between them. Once the bales are lifted off the ground they can be transported to storage and stacked by raising the jaws, or the hay may be fed to cattle. The vehicle frame is surrounded by feeder bars which allow cattle to access the hay contained in the vehicle, by sticking their necks between the bars.

4 Claims, 5 Drawing Sheets

AGRICULTURAL VEHICLE FOR TRANSPORTING AND FEEDING HAY

BACKGROUND

In the past farmers would form bales of hay into cubes which could be picked up and stacked by hand or by machines designed to handle the cubes. The bales could then be transported for storage or delivered to cattle for feed.

Today it is common practice for farmers to roll hay into large bales which are too big for a man to handle and the old machines designed for the cubic bales are useless for handling the round bales.

There is a need for a machine that will pick up a large round bale of hay for transport to storage that can double as a feeder.

There are many new machines on the market to move the round bales. Most of the new machines use a forklift type device to spear and lift round bales of hay. There are several other types of round bale movers but each lacks the features of the present invention which make it a superior hay mover. None of the other machines found double as a hay feeder.

SUMMARY OF THE INVENTION

The present invention has an inverted U shaped frame which supports at least one pair of opposing jaws for grasping and lifting round bales of hay. The jaws are supported at the top of the U shaped frame and have hydraulic cylinders above the bale of hay which operate the jaws so as not to interfere with the bale. The hay mover doubles as a hay feeder which is a feature no other hay mover of this type has. The invention also has a means of raising the bales of hay for stacking in storage.

DETAILED DESCRIPTION OF THE INVENTION

The invention relates to an agricultural vehicle for transporting, stacking and feeding bales of hay. It is designed to pick up bales of hay in the field and transport them to storage or to cattle for feeding or to a storage area. If the bales are taken to storage the bales may need to be stacked, and the invention, in one embodiment, is capable of stacking or unstacking the bales. A front cross section view of the invention is shown in FIG. 1 with a round bale of hay 2.

The invention consists of a frame having a longitudinal main frame member 3, and a lateral main frame member 4.

Figure 3:
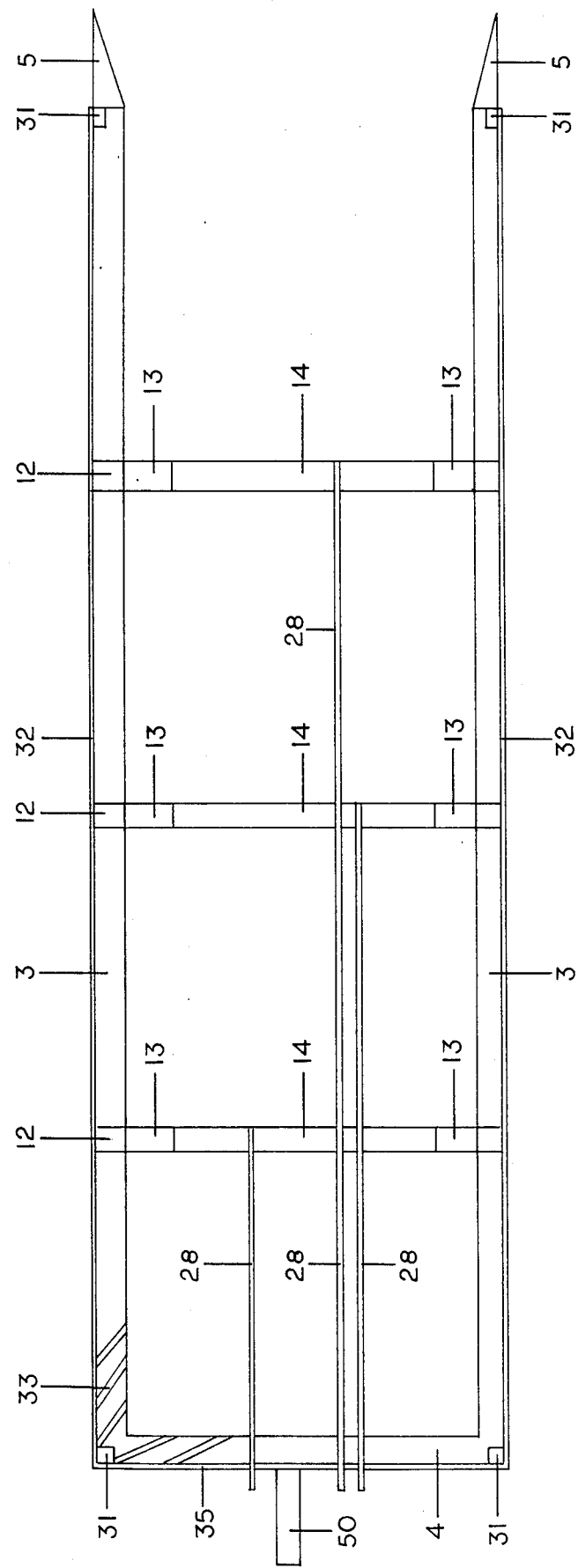
FIG. 3 is a top view of the invention.
Figure 4:
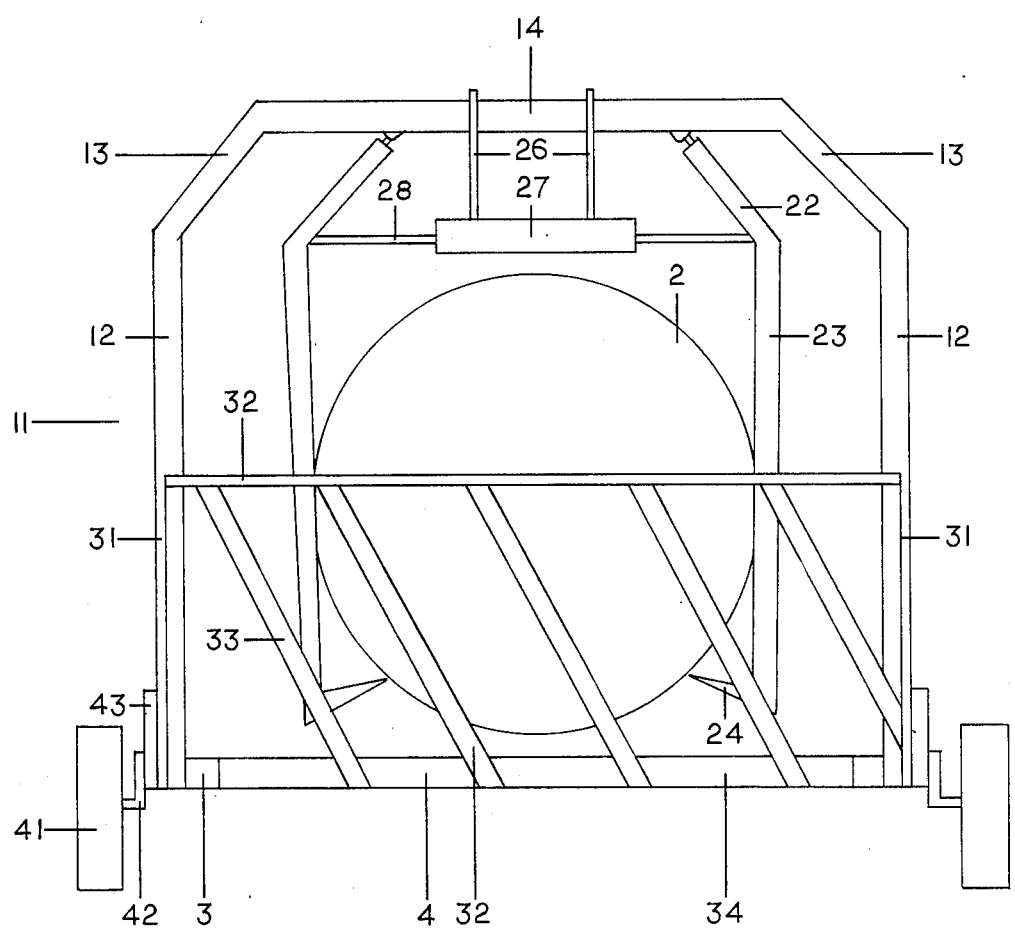
FIG. 4 is a rear view of the invention with the wheels lowered and the jaws closed.
Figure 5:
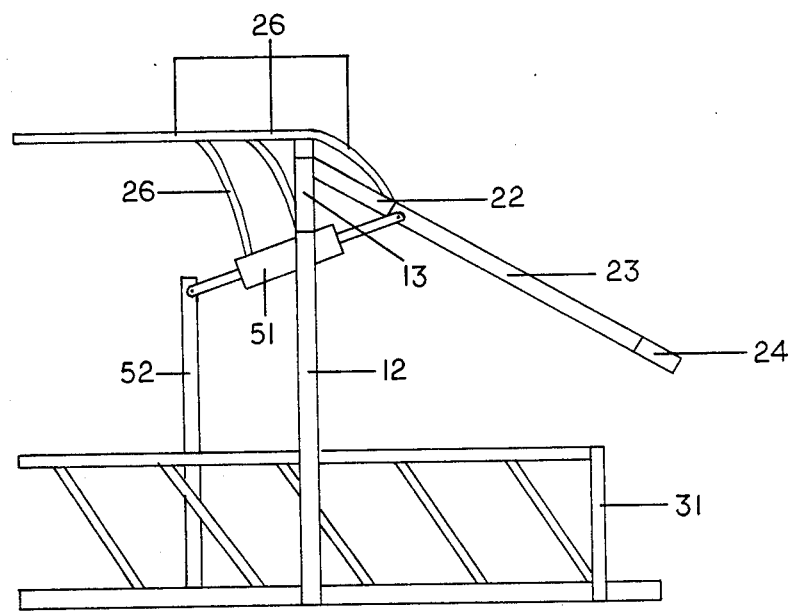
FIG. 5 is a sectional side view showing the bale lifting option.

The rear of the longitudinal frame member is preferably angled as shown at 5, in FIG. 3, to urge the bails of hay between the the longitudinal frame members when backing the vehicle to pick up bales of hay.

Figure 1:
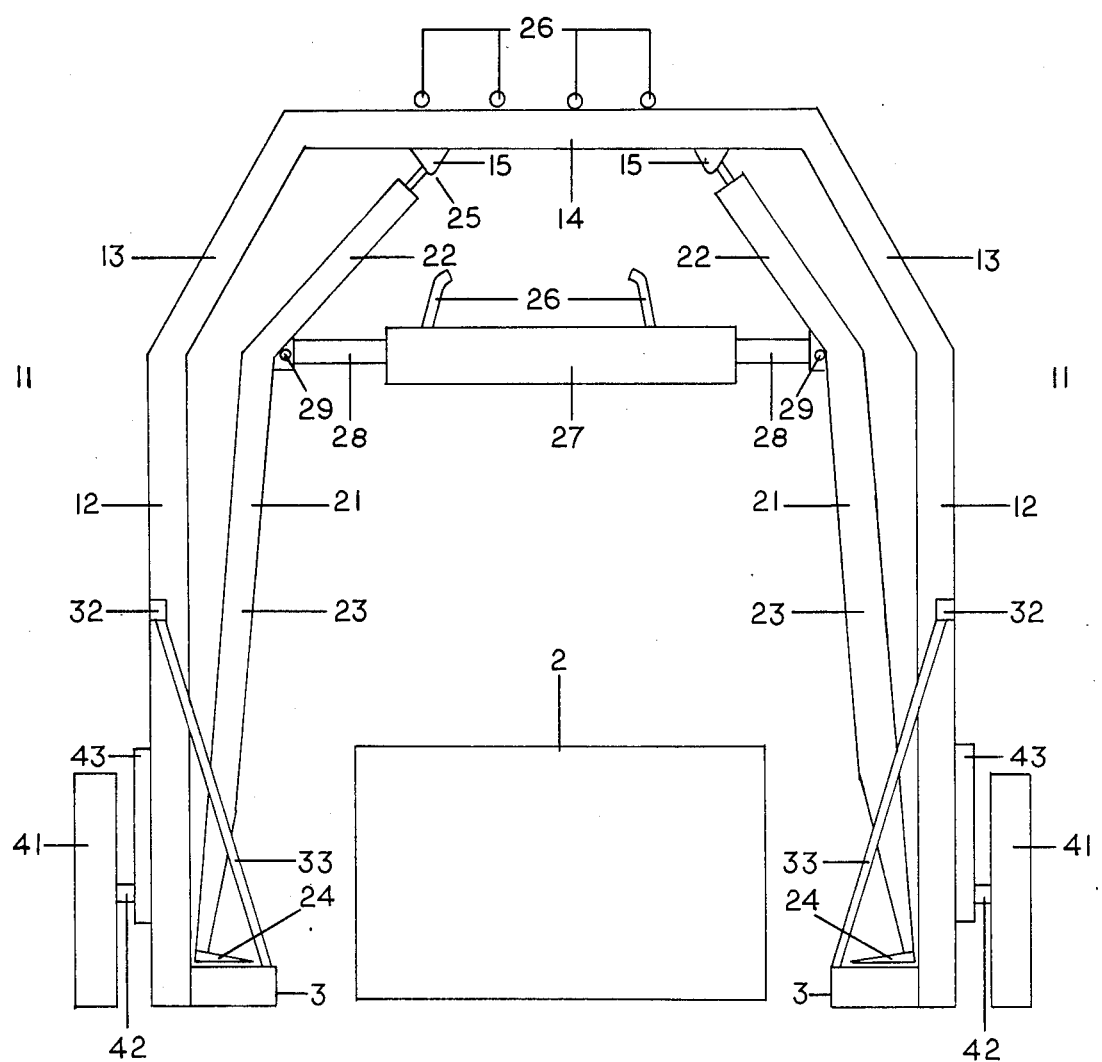
FIG. 1 is a front cross sectional view of the invention with the wheels raised and the jaws open.
Figure 2:
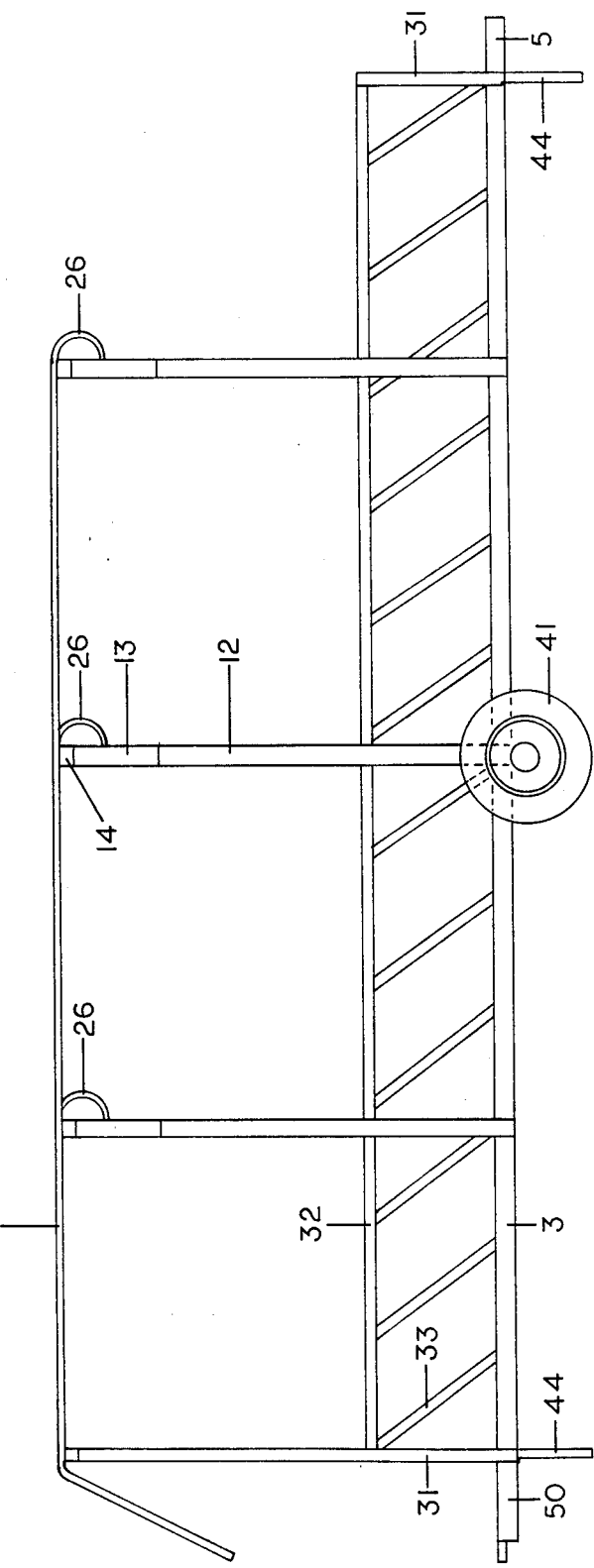
FIG. 2 is a side view of the invention.

The invention has an inverted U shaped frame member shown generally at 11, in FIG. 1. The U shape frame member has a side frame member 12, an inclined frame member 13, and a top frame member 14. On the underside of top frame member 14 are plates 15 for pivotally attaching jaws 21. Each jaw is made up of an inclined portion 22, a side portion 23, and a foot portion 24. The jaws are for engaging a bale of hay 2. The side portions of the jaws 23 engage the sides of the bales of hay. The foot portion 24 gets under the bale and digs into the bale to help hold it more securely. The inclined portion 22 of the jaw 21 pivoted on the top of the U shaped frame member as it is causes the foot portion 24 of the jaw to swing upward as the jaws move together to grasp the bale, thus lifting the bale off the ground. This is helpful in dislodging bails which may be frozen to the ground.

The pivot points of the jaws are important. They should be approximately one half the distance from the side of the inverted U shaped frame member 12 to the center of the top of the inverted U shaped frame member 14. When the angle of attachment between the jaws inclined portion 22 and side portion 23 is as shown in FIG. 1, and the pivot points 15 are as shown the foot portion of the jaw 24 arcs upward as the jaws are closed which helps lift the bale.

When the jaws are fully extended the jaws foot portion 24 is nested just above the longitudinal main frame 3, and the side portion 23 of the jaw is alongside the side frame member 12. This will be helpful in the cattle feeding function in that the jaws will not interfere with the cattle's access to the hay.

The jaws 21 are moved by connecting the two jaws to one another by means of a hydraulic cylinder 27 with arms 28. The connection should be at the joint of the inclined portion 22 and the side portion 23. Plate 29 is placed on the jaw at that point for pivotally connecting the jaws 21 to the hydraulic arms 28. The connection at this point gives the jaws 21 sufficient leverage for lifting the hay and also places the hydraulic arms 28 above the bale of hay so it will not interfere with the bale 2.

When the hydraulic arms 28 draw the jaws 21 together the jaws will automatically center the bale 2 between the jaws and apply an even pressure to both sides of the bail, no matter what size bale of hay is to be transported.

Another advantage of this design is that there is no lateral pressure on the sides of the frame 11 so that it does not have to be reenforced to stand the pressure and can therefore be made of lighter weight material, which is advantageous in that it costs less and weighs less.

The hydraulic lines 26 are placed on top of the top frame member 14 to stay out of the way of the bales and the working parts of the machine. The hydraulic lines 26 are then easily connected to the hydraulic cylinders 27 since they are near the top portion 14.

One advantage of this machine is that it doubles as a feeder. To accomplish this feeder bar support posts 31 are attached at the front and rear of the longitudinal main frame member 3. A longitudinal feeder bar 32 is attached to the feeder bar support posts and to the outside of the side frame member 12, several feet above the longitudinal frame member 3. Feeder bars 33 are angled downward longitudinally and angled inward from the longitudinal feeder bar 32 to the inside of the longitudinal main frame 3. A front feeder support bar 35 extends between the front feeder bar posts 31 and feeder bars extend between the front feeder bar and the lateral frame member 4. A gate 34 with feeder bars 33 is attached at the back of the vehicle. Thus the feeder bars 33 go around the entire vehicle. Cattle can be fed hay by transporting the hay to the cattle and extending the jaws to release the hay. The cattle can stick their necks through the feeder bars 33 to get to the hay but can not step on, scatter or otherwise waste the hay.

The longitudinal frame members 3 are preferably about 7 feet apart. Since the average cows neck is about 3.4 feet long, the average cow may therefore reach the hay in the middle of the hay feeder.

The feeder bars 33 are preferably angled longitudinally to make the cattle turn their heads to get in and out of the feeder. When they have to turn their heads to escape they must drop the hay in their mouths first preventing the hay from being scattered.

The vehicle has axles 42 attached to the longitudinal main frame member 3 on each side of the vehicle and wheels 41 attached to the axles. The wheels are preferably raised and lowered relative to the longitudinal main frame member 3, hydraulically by hydraulic cylinders 43 so that the frame may rest on the ground or on its legs when the vehicle is used as a feeder. The cattle can't easily move the feeder when in this mode.

The wheels are also raised when a bale of hay is to be grasped by the jaws to get the foot of the jaw closer to the bottom of the bail of hay. The wheels are then lowered to transport the vehicle so that no part of the vehicle or any part of the bales of hay makes contact with the ground.

There is also a trailer hitch 50 attached to the front of the vehicle for towing the vehicle with a tractor or a pickup truck.

Preferably there are hydraulic take off connections between the tractor or truck and the vehicle.

It is also preferable to have legs 44 at each corner of the frame for the feeder function of the vehicle. The legs can be extended, the wheels raised and the trailer hitch released to have the feeder stand on its own.

Preferably the jaws 21 are attached to the top of the U shaped frame member 14 by a universal joint 25 so that the jaws may swing longitudinally, thus raising the foot of the jaws for stacking bales of hay.

To raise the jaw, hydraulic cylinders 51 are attached between the side of the U shaped frame member 12 and the lift support post 52.

Other features are a tarp which is fitted over the top of the vehicle to protect the hay from rain and a fodder attachment, held between the jaws, for hauling and feeding fodder.

I claim:

1. An agricultural vehicle for lifting, transporting and feeding round bales of hay consisting of two longitudinal main frame members having a front and a back which form the sides of the vehicle,
    a lateral frame member attached to the front of each of the longitudinal main frame members for forming the front of the vehicle,
    at least one inverted U shaped frame member having a top, and two sides, one side attached to one main frame member and the other side attached to the other main frame member,
    a pair of opposing jaws attached to each inverted U shaped frame member, each jaw pivotally attached to the top of the U shaped frame member,
    a hydraulic cylinder with two arms, one arm attached to each jaw for drawing the jaws together to grasp a bail of hay,
    a trailer hitch attached to the lateral frame member,
    a pair of wheels, one attached to each longitudinal main frame member and a means to raise and lower the wheels relative to the longitudinal main frame member so that when the wheels are raised the longitudinal main frame may rest on the ground and when the wheels are lowered the vehicle may be transported by use of the wheels without any part of the vehicle contacting the ground,
    a retractable leg is attached at the front and back of each longitudinal main frame tube, so that when extended the vehicle may rest on the retractable legs
    a feeder bar support post attached at the front and rear of each longitudinal main frame member,
    a longitudinal feeder support bar attached to the feeder bar support posts and the sides of the inverted U shaped frame on each side of the vehicle,
    a front feeder support bar extending between the feeder bar support posts attached at the front of the longitudinal main frame members,
    a plurality of feeder bars extending from the longitudinal feeder support bars to the longitudinal main frame members and from the front feeder support bar to the lateral frame member so that cattle may stick their necks between the feeder bars to get at the hay,
    a gate attached between the rear feeder bar support posts having a plurality of feeder bars
    the feeder bars are attached such that they are slanted so the cattle must turn their heads at an angle to get their necks between the feeder bars,
    each jaw has an inclined portion with two ends, a side portion with two ends and a foot portion,
    one end of the inclined portion is pivotally attached to the top of a U shaped frame member by a universal joint,
    the other end of the inclined portion is attached at an angle to one end of the side portion,
    the other end of the side portion is attached to the foot portion,
    the inclined portions of the jaws are attached to the top of the U shaped frame at positions approximately one half way to the center of the top of the U shaped frame member,
    a hydraulic cylinder with two arms extends between the jaws attaching to the jaws where the inclined portion meets the side portion,
    the jaws having this configuration and attached to the U shaped frame in this manner will have the side portion of the jaws engage the sides of a bale of hay and the foot portion will engage the bottom of the bale and will lift the bale off the ground.

2. An agricultural vehicle for lifting, transporting and feeding round bales of hay as in claim 1 where there is a plurality of lift support posts attached to the longitudinal main frame members, an hydraulic cylinder connecting each side portion of a jaw to a lift support post, so that the jaws may be moved longitudinally when the hydraulic cylinder is extended or retracted for stacking bales.

3. An agricultural vehicle for lifting, transporting and feeding round bales of hay consisting of two longitudinal main frame members having a front and a back which form the sides of the vehicle,
    a lateral frame member attached to the front of each of the longitudinal main frame members for forming the front of the vehicle,
    at least one inverted U shaped frame member having a top, and two sides, one side attached to one main frame member and the other side attached to the other main frame member, a pair of opposing jaws attached to each inverted U shaped frame member, each jaw pivotally attached to the top of the U shaped frame member, a hydraulic cylinder with two arms, one arm attached to each jaw for drawing the jaws together to grasp a bail of hay, a trailer hitch attached to the lateral frame member, a pair of wheels, one attached to each longitudinal main frame member and a means to raise and lower the wheels relative to the longitudinal main frame member so that when the wheels are raised the longitudinal main frame may rest on the ground and when the wheels are lowered the vehicle may be transported by use of the wheels without any part of the vehicle contacting the ground, each jaw has an inclined portion with two ends, a side portion with two ends and a foot portion, one end of the inclined portion is pivotally attached to the top of a U shaped frame member by a universal joint, the other end of the inclined portion is attached at an angle to one end of the side portion, the other end of the side portion is attached to the foot portion, the inclined portions of the jaws are attached to the top of the U shaped frame at positions approximately one half way to the center of the top of the U shaped frame member, a hydraulic cylinder with two arms extends between the jaws attaching to the jaws where the inclined portion meets the side portion, the jaws having this configuration and attached to the U shaped frame in this manner will have the side portion of the jaws engage the sides of a bale of hay and the foot portion will engage the bottom of the bale and will lift the bale off the ground.

4. An agricultural vehicle for lifting, transporting and feeding round bales of hay as in claim 3 where there is a plurality of lift support posts attached to the longitudinal main frame members, an hydraulic cylinder connecting each side portion of a jaw to a lift support post, so that the jaws may be moved longitudinally when the hydraulic cylinder is extended or retracted for stacking bales.

* * * * *